(12) United States Patent
Graef

(10) Patent No.: US 8,601,988 B2
(45) Date of Patent: Dec. 10, 2013

(54) FREE PISTON ASSEMBLY AND METHOD FOR CONTROLLING A FREE PISTON ASSEMBLY

(75) Inventor: Juergen Graef, Augsburg (DE)

(73) Assignee: UMC Universal Motor Corporation GmbH, Stuttgart (DE)

( * ) Notice: Subject to any disclaimer, the term of this patent is extended or adjusted under 35 U.S.C. 154(b) by 982 days.

(21) Appl. No.: 12/686,235

(22) Filed: Jan. 12, 2010

(65) Prior Publication Data

US 2010/0162998 A1      Jul. 1, 2010

Related U.S. Application Data

(63) Continuation of application No. PCT/EP2008/059531, filed on Jul. 21, 2008.

(30) Foreign Application Priority Data

Jul. 23, 2007  (DE) .......................... 10 2007 035 914

(51) Int. Cl.
 *F02B 71/00*  (2006.01)
(52) U.S. Cl.
 USPC .................... 123/46 SC; 123/46 R; 123/46 H
(58) Field of Classification Search
 USPC ......... 123/46 E, 3, 46 A, 46 R; 903/903, 905, 903/906; 290/1 R, 40 R; 310/15, 12.12; 92/85 B, 143; 322/3
 See application file for complete search history.

(56) References Cited

U.S. PATENT DOCUMENTS

| | | | |
|---|---|---|---|
| 4,154,200 A | 5/1979 | Jarret et al. | |
| 4,454,426 A | 6/1984 | Benson | |
| 4,480,611 A * | 11/1984 | Wendt | 123/197.5 |
| 5,002,020 A * | 3/1991 | Kos | 123/46 E |
| 5,287,827 A * | 2/1994 | Almendinger et al. | 123/46 R |
| 6,181,110 B1 | 1/2001 | Lampis | |
| 6,199,519 B1 | 3/2001 | Van Blarigan | |
| 6,491,813 B2 * | 12/2002 | Verde | 210/137 |

(Continued)

FOREIGN PATENT DOCUMENTS

| | | |
|---|---|---|
| DE | 2217194 | 11/1972 |
| DE | 113593 | 11/1974 |

(Continued)

OTHER PUBLICATIONS

Van Blarigan, Peter "Adanced Internal Combustion Engine Research," Proceedings of the 2000 DOE Hydrogen Review Program.

*Primary Examiner* — Thanh Truong
*Assistant Examiner* — Omar Morales
(74) *Attorney, Agent, or Firm* — Muncy, Geissler, Olds & Lowe, PLLC

(57) ABSTRACT

Free piston assembly, comprising at least one piston accommodating device, at least one piston device having a first piston surface and a second piston surface facing away from the first piston surface, which is moveable in a linear manner in the corresponding piston accommodating device, and an expansion space which is arranged in the piston accommodating device and delimited by the first piston surface, wherein the piston device is arranged to be driven by the action of a medium which expands in the expansion space, wherein a resilience space arranged in the at least one piston accommodating device is delimited by the second piston surface, and wherein the resilience space is connected to at least one pre-compression chamber in fluidic manner.

25 Claims, 10 Drawing Sheets

(56) References Cited

U.S. PATENT DOCUMENTS

| | | | |
|---|---|---|---|
| 2004/0065277 A1* | 4/2004 | Schaeffer | 123/46 C |
| 2005/0081804 A1* | 4/2005 | Graf et al. | 123/46 E |
| 2009/0101005 A1 | 4/2009 | Phl et al. | |

FOREIGN PATENT DOCUMENTS

| | | |
|---|---|---|
| DE | 3103432 | 9/1982 |
| DE | 4344915 | 7/1995 |
| DE | 19781913 T1 | 8/1999 |
| DE | 10219549 B4 | 12/2003 |
| DE | 10242141 A1 | 3/2004 |
| DE | 102004062440 | 6/2006 |
| EP | 1398863 A1 | 3/2004 |
| GB | 854255 | 11/1960 |
| WO | WO-01/45977 A2 | 6/2001 |
| WO | WO-03/091556 A1 | 11/2003 |
| WO | WO-2007/147789 A1 | 12/2007 |
| WO | WO-2008/037980 A2 | 4/2008 |

* cited by examiner

FREE PISTON ASSEMBLY AND METHOD FOR CONTROLLING A FREE PISTON ASSEMBLY

This application is a continuation of international application number PCT/EP2008/059531 filed on Jul. 21, 2008.

The present disclosure relates to the subject matter disclosed in international application number PCT/EP2008/059531 of Jul. 21, 2008 and German application number 10 2007 035 914.6 of Jul. 23, 2007 which are incorporated herein by reference in their entirety and for all purposes.

BACKGROUND OF THE INVENTION

The invention relates to a free piston assembly comprising at least one piston accommodating device, at least one piston device which moves linearly in the corresponding piston accommodating device and has a first piston surface and a second piston surface that faces away from the first piston surface, and an expansion space which is formed in the piston accommodating device and is delimited by the first piston surface, wherein the piston device is arranged to be driven by the action of a medium which expands in the expansion space.

Furthermore, the invention relates to a method for controlling a free piston assembly which comprises a piston accommodating device, a piston device that moves linearly in the piston accommodating device and a resilience space.

With the aid of a free piston assembly for example, chemical energy can be partially converted by device of a combustion process into mechanical energy, namely the kinetic energy of a piston device, and then in turn, this mechanical energy can be converted at least partially into electrical energy using a linear drive. By arranging for the movement of the piston to be in the form of the movement of a free piston, a purely linear motion of the piston can be realized without the need to provide a crankshaft.

Devices of this nature can, for example, be employed as part of a hybrid drive for motor vehicles especially in connection with the concept of serial hybrid arrangements. They can also be employed as compact current generating units for generating electricity or else be utilised in connection with stationary applications such as engine-based cogeneration systems for example.

Free piston assemblies are known from GB 854 255 and DE 22 17 194 C3 for example.

Combustion devices with electrical generators are also known from U.S. Pat. No. 6,199,519 B1, DE 31 03 432 A1, DDR patent specification No. 113,593 and DE 43 44 915 A1 or from the article "Advanced internal combustion engine research" by P. van Barrigan, Proceedings of the 2000 DOE of Hydrogene Program Review.

From DE 102 19 549 B4, there is known a free piston assembly incorporating an electrical linear drive which comprises at least one piston accommodating device and at least one piston device that is arranged in the piston accommodating device such as to be moveable in a linear manner, wherein the piston device comprises a rotor assembly and wherein a stator assembly is arranged on the piston accommodating device. The at least one piston device is arranged to be driven by the action of a medium which expands in an expansion chamber, wherein the piston stroke is adapted to be varied by the linear drive in such a manner that the dead centres in the movement of the piston device are definable.

Another free piston assembly incorporating an electrical linear drive is described in WO 01/45977 A2.

From EP 1 398 863 A1, there is known a free piston assembly wherein a first displacement chamber, in which a piston in the at least one piston device upon which the medium is acting, is moveable, and a second displacement chamber in which the rotor assembly associated therewith is moveable, are separate chambers.

From DE 197 81 913 T1, there is known a method for controlling the movement of a linear generator, wherein the linear generator is driven by an internal combustion engine having two mutually opposed pistons aligned along a common axis. The current consumption is controlled in such a way that, during the back-and-forth cyclic movement of the generator, a resistive force is produced which is effective, substantially proportionately, on the generator at least in the central stroke range of the speed of movement of the generator. Pressure sensors are provided in the combustion chambers, a control unit triggering a device for igniting the mixture supplied to the combustion chambers when a predetermined pressure is reached.

A free piston assembly with an electrical linear drive is known from DE 10 2004 062 440 B4. The free piston assembly comprises a resilience chamber in which a gas is accommodated. At least one pressure sensor, by device of which the position and/or the speed of the piston device can be determined from a measurement of the pressure of the gas in the resilience chamber, is provided in the resilience chamber. Hence, with the aid of the measured pressure, a control and/or regulating process for the free piston assembly can be undertaken, for example, with respect to the injection of fuel into the expansion chamber, the ignition time point for the fuel in an expansion chamber and/or in regard to valves arranged on the expansion chamber.

From U.S. Pat. No. 5,002,020, there is known a hybrid engine which comprises a reciprocating piston and an electromagnetic transducer for control/regulation and power output purposes.

A free piston engine having a double action arrangement is known from the not prior published WO 2008/037980 A2. One piston is subjected to a conventional internal combustion cycle on one side and a steam expansion cycle on the other side.

SUMMARY OF THE INVENTION

In accordance with the present invention, a free piston assembly is provided, which can be realized in a simple manner and which is of compact construction.

In accordance with an embodiment of the invention, a resilience space arranged in the at least one piston accommodating device is delimited by the second piston surface, and the resilience space is connected in fluidic manner to at least one pre-compression chamber.

With the aid of the solution in accordance with the invention, the length of the piston accommodating device can be optimally used.

In particular, it is then possible for example, to minimize the spacing between the expansion space and the resilience space if this spacing substantially corresponds to the corresponding thickness of a piston.

Furthermore, it is possible to construct a free piston assembly including a drive part and an application part in modular manner. In the case of the solution in accordance with the invention, an active element can be guided out of the rear end of the drive part in a simple manner. In consequence, applications such as compressors and linear drives for example can be coupled up in modular manner. It is possible thereby, for several applications to be coupled up using serial and/or parallel couplings.

In the case of the solution in accordance with the invention, it is possible to use a blowby from the expansion space to the resilience space. In the event of blowby, gas from the expansion space enters the resilience space due to leakages between the piston device and the piston accommodating device. If the resilience space is in the form of a gas spring chamber, the gas pressure in the resilience space can be maintained by device of the blowby or the blowby can be used for reducing the pressure loss in the resilience space. If so required, the blowby can be set in a defined manner by utilising a defined setting for the amount of "leakage".

The resilience space is connected to at least one pre-compression chamber in fluidic manner. It is thus possible for example, to control or regulate the gas pressure and hence the elastic properties of the resilience space.

It is expedient, if the expansion space and the resilience space are arranged linearly one behind the other. A compact structure with minimized longitudinal dimensions can thereby be obtained.

In particular, the expansion space and the resilience space are separated by a piston of the piston device, wherein the piston comprises the first piston surface and the second piston surface. The spacing between the expansion space and the resilience space is minimized thereby.

For the same reason, it is expedient if the internal length of the piston accommodating device is composed of the length of the expansion space, the spacing between the first piston surface and the second piston surface and the length of the resilience space.

A compact structure can be realized, if the spacing between the first piston surface and the second piston surface amounts to at most 30% of the total internal length of the piston accommodating device.

It is especially very advantageous if the at least one piston accommodating device comprises a side from which at least one linearly moveable active element that is connected to the piston device is guided out. Mechanical energy can be "extracted" from the active element, i.e. one or more applications can be coupled to the active element. A modular structure consisting of a free piston assembly incorporating a drive part and an application part, especially a replaceable application part, can thereby be realized.

In particular, the at least one active element is a piston rod.

It is envisaged that the side be an end face which is oriented transversely relative to the direction of motion of the piston device. A coupling side of the drive part is thus made available in a simple manner.

In particular, a wall which faces the second piston surface is arranged at said side. Thereby, in simple manner, there is provided a device for coupling out the mechanical energy.

Furthermore, it is expedient if this wall delimits the resilience space. The resilience space does not need to be equipped with device for supplying it with fuel or the like, and exhaust gases do not need to be removed therefrom. This thereby results in a simple structure. In principle however, it is also possible for the active element to be guided out from a wall which delimits the expansion space.

It is expedient, if the wall has an opening through which the at least one active element is passed. The mechanical energy can then be coupled out in a simple manner.

Furthermore, it is advantageous if a bearing for the at least one active element is arranged in this wall. The bearing is, for example, a slide bearing for guiding the displacement of the active element. The overall support for said element can thereby be improved.

It is envisaged that a sub-portion of the at least one active element be guided through the resilience space. This thus results in a simple structure and provides a simple device for coupling out the mechanical energy. However, as mentioned above, it is in principle also possible for the at least one active element to be guided through the expansion space.

It is especially very advantageous, if the at least one active element comprises a coupling for linking it to an application. An application can thus be attached in a simple manner in order to utilise the mechanical energy from the drive part.

It is expedient for the expansion space to have at least one inlet port associated therewith. A fuel can be admitted with the aid thereof or an expandable thermal transfer medium can be admitted thereby.

In particular, a preferably controllable valve is arranged at the at least one inlet port in order to enable the ingress of fuel or the supply of the expandable thermal transfer medium to be controlled.

If the expansion space has at least one outlet port associated therewith, then, for example, exhaust gases resulting from the combustion process can be removed therefrom or the expanded thermal transfer medium can be removed therefrom.

Accordingly, it is expedient if a (controllable) valve is arranged at the outlet port. It is particularly expedient, if the resilience space is a gas spring space in which a compressible medium is accommodated. The compressible medium (a gas) is held under pressure in the gas spring space. A back and forth movement of the piston device can thereby be created. Furthermore, it is possible to control the movement of the piston device as described in WO 03/091556 A1.

It is expedient if a control unit is provided for controlling the connection in order to enable the pressure in the resilience space to be adjusted for example.

In one exemplary embodiment, the at least one pre-compression chamber is connected to the resilience space by an end face of the piston accommodating device. This thereby results in the piston accommodating device and the pre-compression chamber being connected linearly one behind the other.

It is in principle also possible for the at least one pre-compression chamber to be arranged such that it is spaced from an active element.

In an alternative embodiment, an active element is guided through the at least one pre-compression chamber.

It is especially advantageous, if at least one channel which comprises a first opening and a second opening is arranged on the at least one active element, wherein the position of the first opening and/or the second opening in the resilience space and/or a pre-compression space of a pre-compression chamber is dependent on the position of the at least one active element. This thus makes it possible for example, for the process of equalising the pressure between the pre-compression space and the resilience space to be controlled in time-dependent manner in the absence of externally time-controlled valves. It is thus no longer necessary to use high pressure valves for example.

In particular, the pre-compression chamber and the resilience space are connected to the channel in fluidic manner in one or more positions of the piston device. A pressure equalising process is thereby possible.

Hereby, provision may be made for the position or positions to lie at a point of reversal or in the proximity of a point of reversal of the piston device. By appropriate construction of the channel and the openings, it is then in principle possible to set this to be the upper point of reversal or the lower point of reversal.

Provision may be made for (at least) one application to be arranged in the pre-compression chamber. The pressure in the resilience space can be adjusted with the aid of a pre-compression space in the pre-compression chamber. A housing, in which an application such as a linear drive is arranged, can be used for the purposes of forming the pre-compression chamber. A compact manner of construction whilst minimising the overall length of the free piston assembly thereby results.

For example, it may be provided that at least one linear drive can be or is connected to the piston device. The linear drive is in the form of a linear generator for example. An electric current can then be generated. It is in principle also possible to control the movement of the piston device by the linear drive as is described in WO 03/091556 A1.

The at least one linear drive comprises a stator and an actuator which are connected to the at least one active element of the piston device. The piston device provides the mechanical energy for generating induction currents.

For example, the at least one linear drive follows the piston accommodating device in a direction parallel to the direction of motion of the piston device. For example small transverse dimensions can thus be achieved.

It is also possible for the at least one linear drive to at least partially surround the at least one piston accommodating device and/or a pre-compression chamber. The longitudinal dimensions can thus be kept small.

For example, it is also possible that at least one compressor can be or is connected to the piston device. A gas or a liquid is compressed by the compressor for example.

In particular, a piston rod of the at least one compressor is connected to an active element of the piston device.

In accordance with the present invention, a method is provided, which can be realized in a simple manner.

In accordance with an embodiment of the invention, in the case of the free piston assembly which comprises a piston accommodating device, a piston device that is moveable in a linear manner in the piston accommodating device and a resilience space, the fluidic connection between the resilience space and a pre-compression space is opened or closed in dependence on the position of the piston device, wherein one or more piston rods of the piston device are guided in the resilience space and the pre-compression space and at least one channel having a first opening and a second opening is arranged on the at least one piston rod.

The method in accordance with the invention has the advantages already mentioned in connection with the device in accordance with the invention.

In the case of the method in accordance with the invention, the pressure in the resilience space is automatically controlled by the position of the piston device. For example, the pressure in the pre-compression space is set as the working point and an automatic pressure equalising process can take place. High pressure valves for the control of the pressure in the resilience space are then no longer necessary. In addition, an external timed control process is no longer necessary since the control process is effected automatically by the position of the piston device.

In particular, the first opening and the second opening are connected in fluidic manner. An exchange of gas can thus take place via the channel.

In particular, there are one or more positions of the piston device in which the first opening is in the resilience space and the second opening is in the pre-compression space. The gas can thereby be equalised between the resilience space and the pre-compression space and, due to this gas equalisation process, the pressure in the resilience space in particular can be controlled.

Furthermore, it is expedient if there are one or more positions of the piston device in which both the first opening and the second opening are located in either the resilience space or in the pre-compression space. In this case, interchange of the gas between the pre-compression space and the resilience space cannot take place.

The following description of preferred embodiments taken in conjunction with the drawings will serve for a more detailed explanation of the invention.

DETAILED DESCRIPTION OF THE INVENTION

Figure 1:
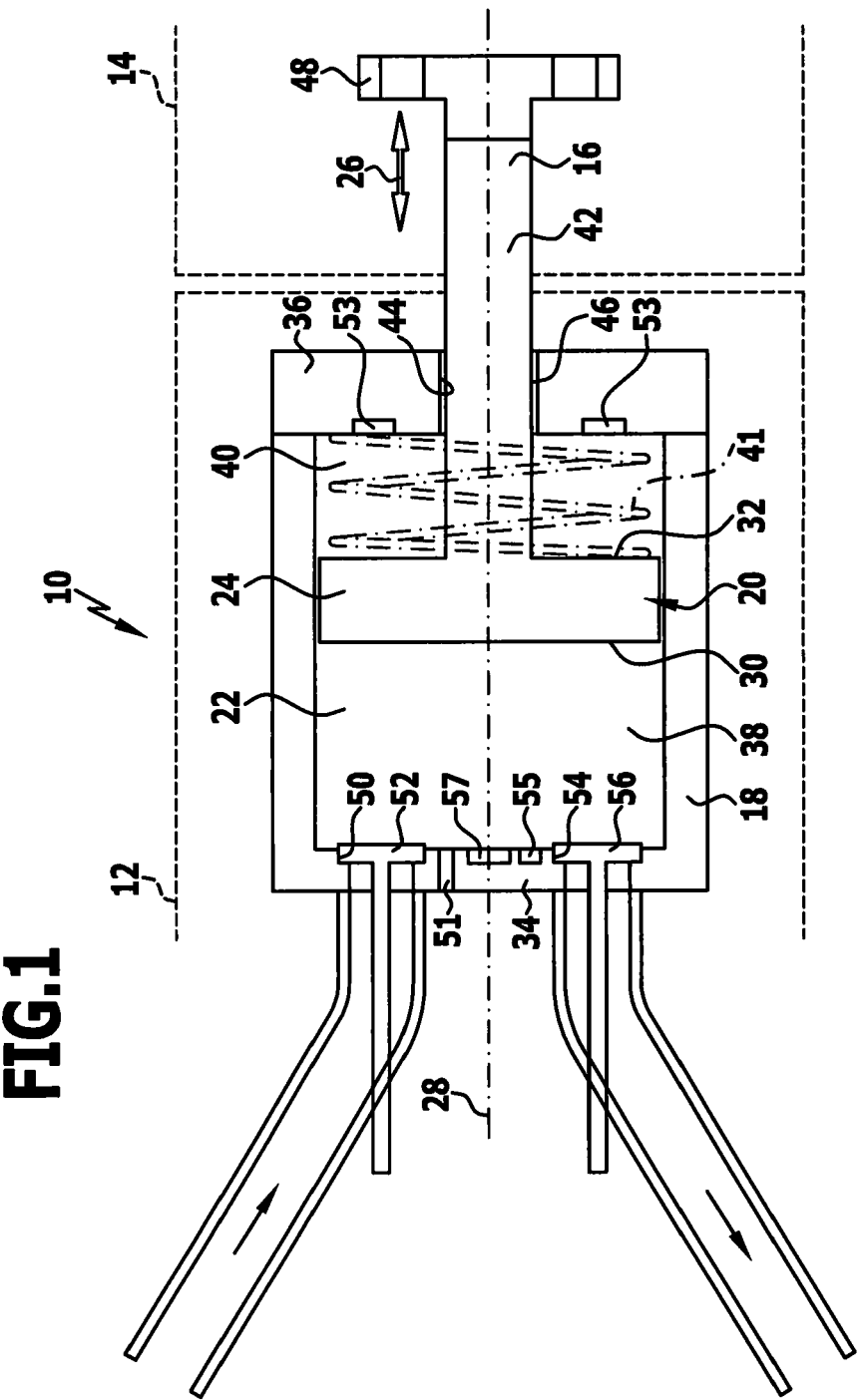
FIG. 1 shows a schematic sectional view of a first exemplary embodiment of a free piston assembly in accordance with the invention.

A first exemplary embodiment of a free piston assembly in accordance with the invention which is shown in FIG. 1 and referenced by 10 therein comprises a drive part 12 and an application part 14. The drive part 12 makes mechanical energy available in the form of a back and forth movement of the active element 16. This mechanical energy can be taken up at the application part 14 by a corresponding application such as a compressor and/or a linear drive as will be described hereinbelow.

The drive part 12 comprises (at least) one piston accommodating device 18 (a cylinder) in which a piston device 20 is arranged such as to be moveable in a linear manner.

The piston accommodating device 18 has a piston space 22 in which a piston 24 of the piston device 20 is moveable in a linear manner in the one and then the other direction 26. Said one and other directions 26 are parallel to a longitudinal axis 28 of the piston accommodating device 18.

The piston 24 has a first piston surface 30 and an opposing second piston surface 32. The first piston surface 30 and the second piston surface 32 are parallel to one another for example. In one embodiment for example, the solid material of the piston 24 lies between the first piston surface 30 and the second piston surface 32.

Alternatively, the piston 24 may comprise one or more cavities between the first piston surface 30 and the second piston surface 32. A cavity serves the purpose of reducing the mass and/or providing thermal decoupling for example. In principle, a cavity can also be used for the internal cooling of the piston 24.

The piston space 22 is delimited at a first end face by a first end wall 34 and at an opposite second end face by a second end wall 36. The first end wall 34 and the second end wall 36 are oriented transversely relative to the longitudinal direction 28 and hence also to the direction of movement 26.

Between the first end wall 34 and the first piston surface 30, there is located an expansion space 38 in which an expansion medium can expand and thereby exert a force on the piston 24.

Between the second piston surface 32 and the second end wall 36, there is formed a resilience space 40 which is in the form of a gas spring space for example. A compressible medium and in particular, a gas, is thus accommodated in the resilience space 40. This compressible medium provides for the spring-like return of the piston 24.

As an alternative or in addition thereto, one or more mechanical spring elements 41 can be arranged in the resilience space 40. At least one spring element 41 is linked to the piston 22 and is supported directly or through an intermediary on the second end wall 36.

The total volume of the piston chamber 22 is composed of the sum of the volumes of the expansion space 38, the resilience space 40 and the volume of the piston 24. The ratio of the volumes of the expansion space 38 and the resilience space 40 is dependent on the position of the piston 24 of the piston device 20. The piston 24 is arranged and guided in the piston chamber 22 in such a way that the expansion space 38 and the resilience space 40 are sealed such as to be mutually gas-tight.

In principle, a blowby between the expansion space 38 and the resilience space 40 is possible due to seal tolerances. The fluid (particularly a gas) entering the resilience space 40 from the expansion space 38 is used as a springy medium in the resilience space 40. The blowby can be utilised for maintaining the pressure or reducing the pressure loss in the resilience space 40. Consequently, in certain circumstances, one can dispense with a fixed pump for maintaining the pressure in the resilience space 40 and the free piston assembly can thus be realized in a compact and economical manner.

The piston device 20 comprises a piston rod 42 which is seated on the piston 24 and is guided through the resilience space 40. The second end wall 36 comprises an opening 44 through which the (gas tight) piston rod 42 is passed. A bearing device 46 in the form of a slide bearing for example is arranged in the opening 44 in order to support the piston rod 42 and thus the piston device 20 in the course of its linear movement in the one and then the other direction 26.

In the exemplary embodiment shown in FIG. 1, the resilience space 40 is sealed with respect to its surroundings so that the compressible medium in the resilience space 40 cannot escape through the opening 44 into the environment.

The piston rod 42 forms the active element 16. A coupling 48, to which an application is adapted to be coupled so as to tap off the available mechanical energy, is arranged on the piston rod 42, preferably at the outer end thereof.

The second end wall 36 forms the outer end of the drive part 12 or is located in the proximity of the outer front end of the drive part 12. Applications can then be attached to the drive part 12 following along in the longitudinal direction 18; they can to a certain extent be connected one behind the other to the drive part 12.

The resilience space 40 is formed in the same piston accommodating device 18 as the expansion space 38. The piston 24 forms the separating device for the expansion space 38 and the resilience space 40.

The first piston surface 30 is circular for example. The second piston surface 32 is circular for example.

One or more application parts 14, which use the mechanical energy that is being provided by the drive part 12, are adapted to be connected to the drive part 12 in modular manner.

The expansion space 38 and the resilience space 40 are formed in the same piston chamber. In consequence, the piston accommodating device 18 can be constructed compactly with relatively small longitudinal dimensions in the direction of the longitudinal axis 28.

The oscillatory displacement (in the one and then the other direction 26) of the active element 16 is produced by expanding gases in the expansion space 38.

In one embodiment, the expanding medium in the expansion space 38 is in the form of combustible gases. An (at least one) inlet port 50 for the expansion space 38 is arranged in the piston accommodating device 18, a fuel or a fuel-oxidizer mixture being introducible into the expansion space 38 through said port. It is in principle possible for separate inlet ports to be provided for the fuel and the oxidizer. A valve 52, particularly a controllable one, is arranged at the inlet port 50. The amount of fuel or fuel-oxidizer mixture being supplied can be controlled by the valve 52.

Furthermore, (at least) one outlet port 54 through which the medium is removable from the expansion space 38 is arranged in the piston accommodating device 18. In particular, an exhaust gas is removable from the expansion space 38.

A valve 56 is arranged at the outlet port 54 in order to enable the removal process to be controlled.

An ignition device 57 for the ignition of a fuel-oxidizer mixture can be associated with the expansion space 38. In principle, self-igniting media could also be used.

In a variant of the embodiment, the expanding medium in the expansion space 38 is a thermal transfer medium which is produced or heated outside the expansion space 38. This thermal transfer medium can expand in the expansion space 38 and thus cause the piston 24 to execute its oscillatory movement.

In this case, the inlet port 50 serves for coupling the expandable thermal transfer medium into the expansion space 38 in a controlled manner. The "expanded" thermal transfer medium can be exhausted through the outlet port 54.

The resilience chamber may have one or more pressure sensors 53 associated therewith for the purposes of measuring the pressure in the resilience space 40.

The pressure sensor or the pressure sensors 53 are arranged on the second end wall 36 for example.

In like manner, the expansion space 38 may have associated therewith one or more pressure sensors 55 which serve for the measurement of the pressure in the expansion space. The pressure sensor or the pressure sensors are arranged, in particular, on the first end wall 34.

Furthermore, the expansion space 38 may have associated therewith at least one injecting valve 51 via which fuel is adapted to be injected for example.

Figure 2:
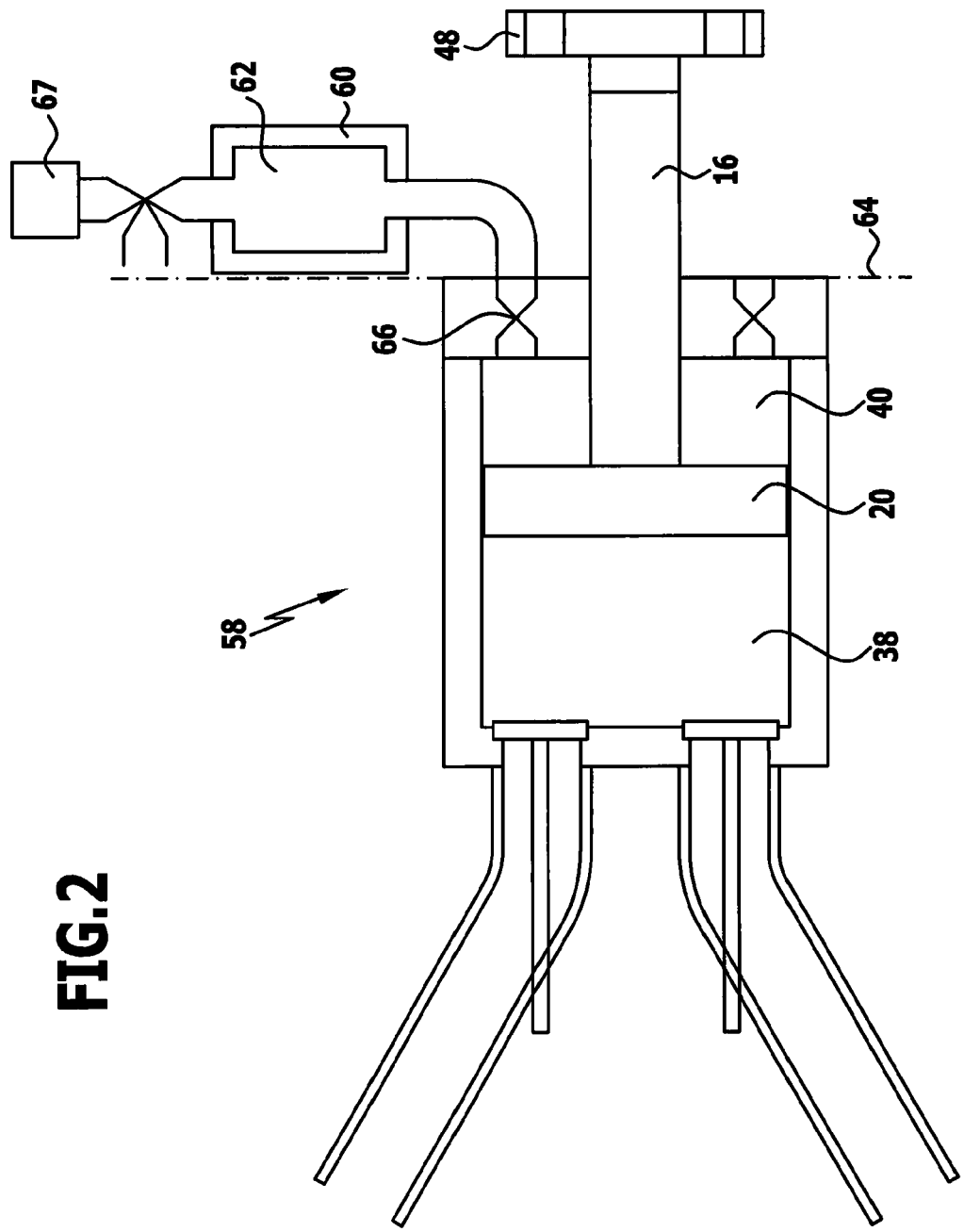
FIG. 2 a schematic illustration of a second exemplary embodiment of a free piston assembly in accordance with the invention.

A second exemplary embodiment of a free piston assembly, which is shown in FIG. 2 and referenced by 58 therein, is basically constructed in the same way as the first free piston assembly 10. The same reference symbols are therefore used for the same elements.

In addition, (at least) one pre-compression chamber 60 comprising a pre-compression space 62 is associated with the resilience space 40. The pre-compression chamber 60 is arranged so that it is spaced from the active element 16. For example, it is arranged behind an end that is defined by a second end face 64. The pre-compression space 62 is connected to the resilience space 40 in fluidic manner by a controllable valve 66. The pressure of the gas spring device in the resilience space 40 can be adjusted by the pre-compression chamber 60 for example. In particular, this pressure can be controlled and thus matched to the special operating mode of the free piston assembly 58.

In one embodiment, the pressure is controlled at the bottom dead centre of the gas spring device in the resilience space 40. The volume of the resilience space 40 is at its greatest and the process of controlling/regulating the pressure is easiest at the bottom dead centre (BDC) of the resilience space 40.

A pump 67 which serves for applying pressure to the pre-compression chamber 60 is attached to the pre-compression space 62.

It is also possible for example, for pressure losses in the resilience space 40 to be equalised by device of the pre-compression chamber 60.

Figure 3:
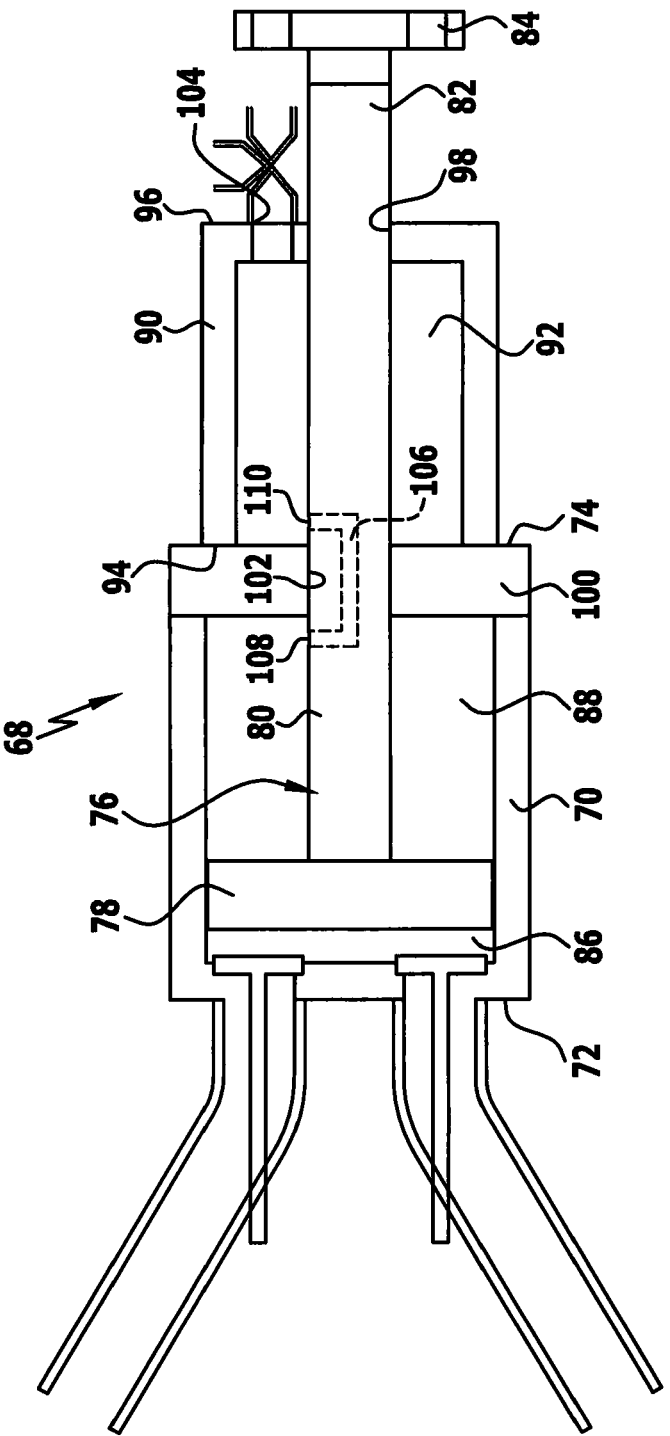
FIG. 3 a schematic illustration of a third exemplary embodiment of a free piston assembly in accordance with the invention.

A third exemplary embodiment of a free piston assembly in accordance with the invention which is shown in FIG. 3 and referenced by 68 therein comprises a piston accommodating device 70 having a first end face 72 and a second end face 74. A piston device 76 comprising a piston 78 and a piston rod 80 is moveable in the piston accommodating device 70 in linear manner. The piston rod 80 forms an active element 82 by device of which mechanical oscillatory energy is transmissible to an application. A coupling 84 for the purposes of attachment to the application is arranged at one end of the active element 82.

The piston accommodating device 70 comprises an expansion space 86 and a resilience space 88 whilst the manner of construction and functioning thereof are basically the same as described above.

A pre-compression chamber 90 having a pre-compression space 92 formed therein is arranged on the second end face 74. A first end face 94 of the pre-compression chamber 74 faces the second end face of the piston accommodating device 70 and, for example, abuts against it or coincides with it. A second end face 96 faces away from the second end face 74 of the piston accommodating device 70.

The pre-compression chamber 90 and the piston accommodating device 70 are arranged such as to lie behind one another. The pre-compression chamber 90 adjoins the piston accommodating device 70 in parallel with the direction of motion of the piston device 76.

An opening 98 through which the active element 82 is fed is provided in a corresponding end wall at the second end face 96 of the pre-compression chamber 90. In particular, a bearing device such as a slide bearing for supporting the active element 82 is arranged in the opening 98. The bearing device and the active element 82 are sealed with respect to the surroundings.

An opening 102 through which the active element 82 is likewise guided is provided in a corresponding end wall 100 at the second end face 74 of the piston accommodating device 70. In particular, a bearing device such as a slide bearing is arranged there. The opening 98 is located between the resilience chamber 88 and the pre-compression space 92 of the pre-compression chamber. The opening 98 is sealed with respect to the active element 82 in such a way that an exchange of gas between the surroundings and the pre-compression space 92 cannot be effected through the opening 98.

The pre-compression chamber 90 comprises one or more openings 104 via which it is possible to control the pressure in the pre-compression space 92.

An (at least one) channel 106, which comprises a first opening 108 and a second opening 110 to an outer surface of the active element 82, is arranged in the active element 82. A gas can flow through this channel 106 via the first opening 108 and the second opening 110. Outside the channel 106, the active element 82 is made of a gas-impervious material.

The channel 106 acts as an "automatic valve" which enables or inhibits an exchange of fluid between the pre-compression space 92 and the resilience chamber 88 in dependence on the position of the active element 82.

In the position of the active element 82 shown in FIG. 3, the second opening 110 lies in the pre-compression space 92 and the first opening 108 is in the resilience chamber 88. Equalisation of the pressure between the pre-compression space 92 and the resilience space 88 can therefore take place. It is thus possible to control the pressure in the resilience space 88 by device of the pressure in the pre-compression space 92 with the goal of realizing a variable spring characteristic for the gas spring device in the resilience space 88 for example.

It is thereby possible to adjust the characteristic in a spatially defined manner (related to the position of the piston) and/or in a temporally defined manner. Basically thereby, a specific spring stiffness can be set for each position of the piston and for each time point.

The channel 106 forms a valve which does not have to be switched externally, but rather, a "self-regulating" process is realized. If, in dependence on the positions of the first opening 108 and the second opening 110 (and the geometrical dimensions of the channel 106), the state is reached wherein the first opening 108 lies in the resilience chamber 88 and the second opening 110 lies in the pre-compression space 92, then a pressure equalising process can take place there. A high pressure valve for the resilience space 88 is not then necessary. Furthermore, it is also unnecessary to externally control the timing of the valve since the position of the active element 82 itself controls the pressure equalising process.

If both the first opening 108 and the second opening 110 lie in the resilience space 88 or if both lie in the pre-compression space 92, then the pressure equalising process cannot take place.

In the exemplary embodiment shown, equalisation of the pressure occurs when the piston 78 is at or in the proximity of a point of reversal in the movement of the piston device 76. Hereby, in dependence on the construction of the channel 106 with its first opening 108 and its second opening 110, it is possible to cause the fluidic connection between the resilience space 88 and the pre-compression space 92 to occur at or in the proximity of the lower point of reversal or the upper point of reversal.

Due to the support and in particular the sliding support for the active element 82 in the opening 98 and/or in the opening 102, the piston 78 no longer has a guiding function. Thus it has to substantially only serve for the sealing between the expansion space 86 and the resilience space 88.

Figure 4:
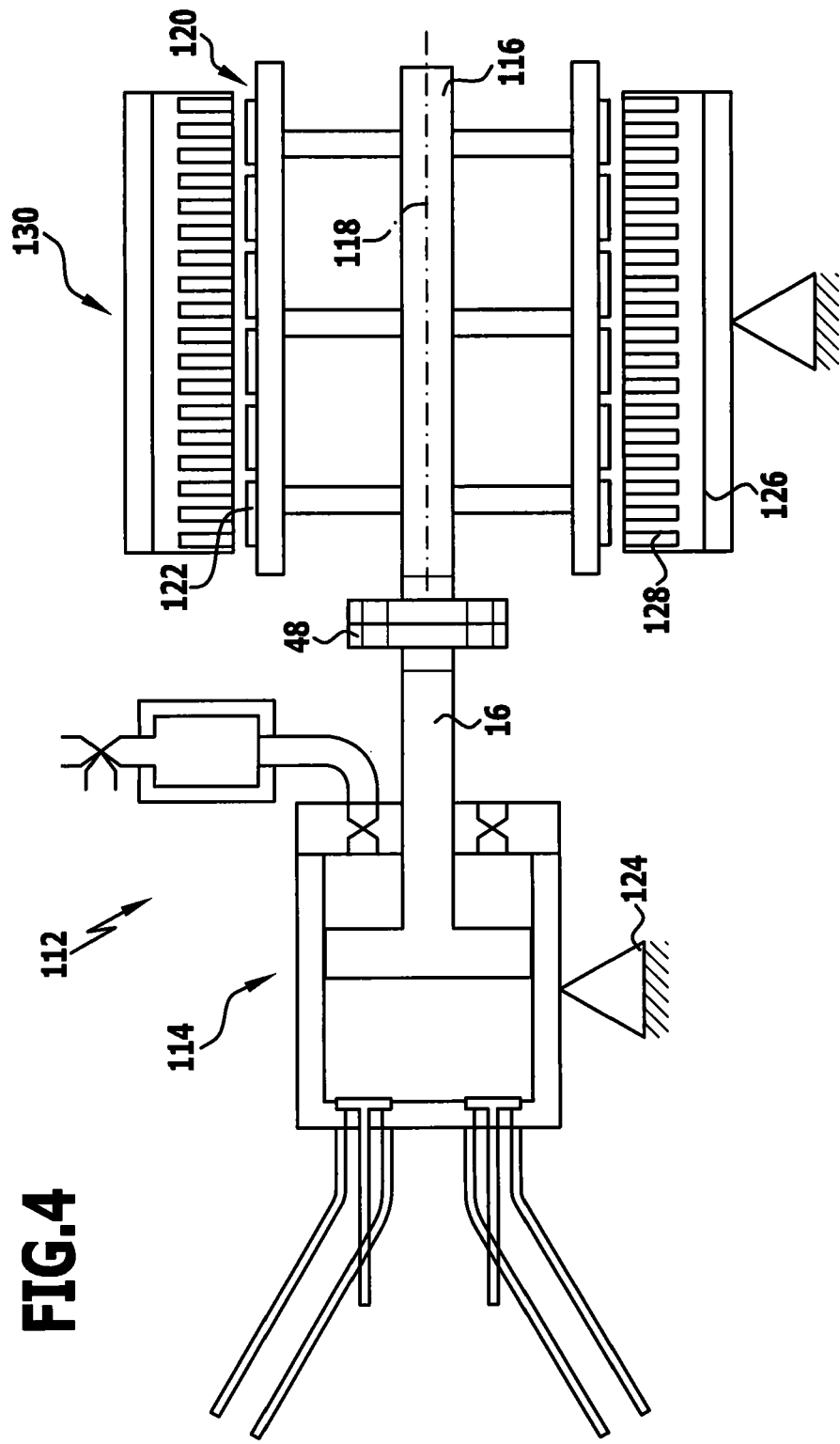
FIG. 4 a schematic illustration of a fourth exemplary embodiment of a free piston assembly in accordance with the invention.

In a fourth exemplary embodiment of a free piston assembly in accordance with the invention which is shown in FIG. 4 and designated as a whole therein by 112, provision is made for a drive part 114 such as was described in connection with FIG. 2. The active element 16 of this drive part is coupled via the coupling 48 to an actuator 116 of a linear drive. The actuator 116 is displaced back and forth in a linear manner by the active element 16.

The actuator 116 moves in a magnetic field and/or produces a magnetic field that is moved by the actuator 116. Thus, in particular, induction currents can be generated when cooperating with a suitable stator.

The actuator 116 carries a magnet device 120 which is spaced from a longitudinal axis 118 and which, for example, comprises permanent magnets 122 of alternating polarity in the longitudinal direction parallel to the longitudinal axis 118.

The drive part 114 is arranged to be static. This is indicated in FIG. 4 by the base 124. A stator 126 which is likewise static cooperates with the actuator 116. The stator 126 comprises windings 128 for example. The magnet device 120 is moved relative to the stator 126 by the back and forth movement of the active element 16 and the back and forth movement of the actuator 116 which is caused thereby. In consequence, currents are induced which are adapted to be tapped off. The corresponding linear drive 130 works as a linear generator which produces an electric current. The mechanical energy produced by the drive part 114 can be converted into current in the linear drive 130.

However, it is in principle also possible for the linear drive 130 to be used for controlling/regulating the piston device of the drive part 114. This is described in WO 03/091556 A1 to which reference is expressly made.

The linear drive 130 is coupled to the active element 16. Other types of application could also be coupled in addition or as an alternative thereto.

The actuator 116 can also be provided with one or more electromagnets. It can comprise shorted turns. It is also possible for it to carry a "passive" tooth-like structure made of magnetically conductive material.

Figure 5:
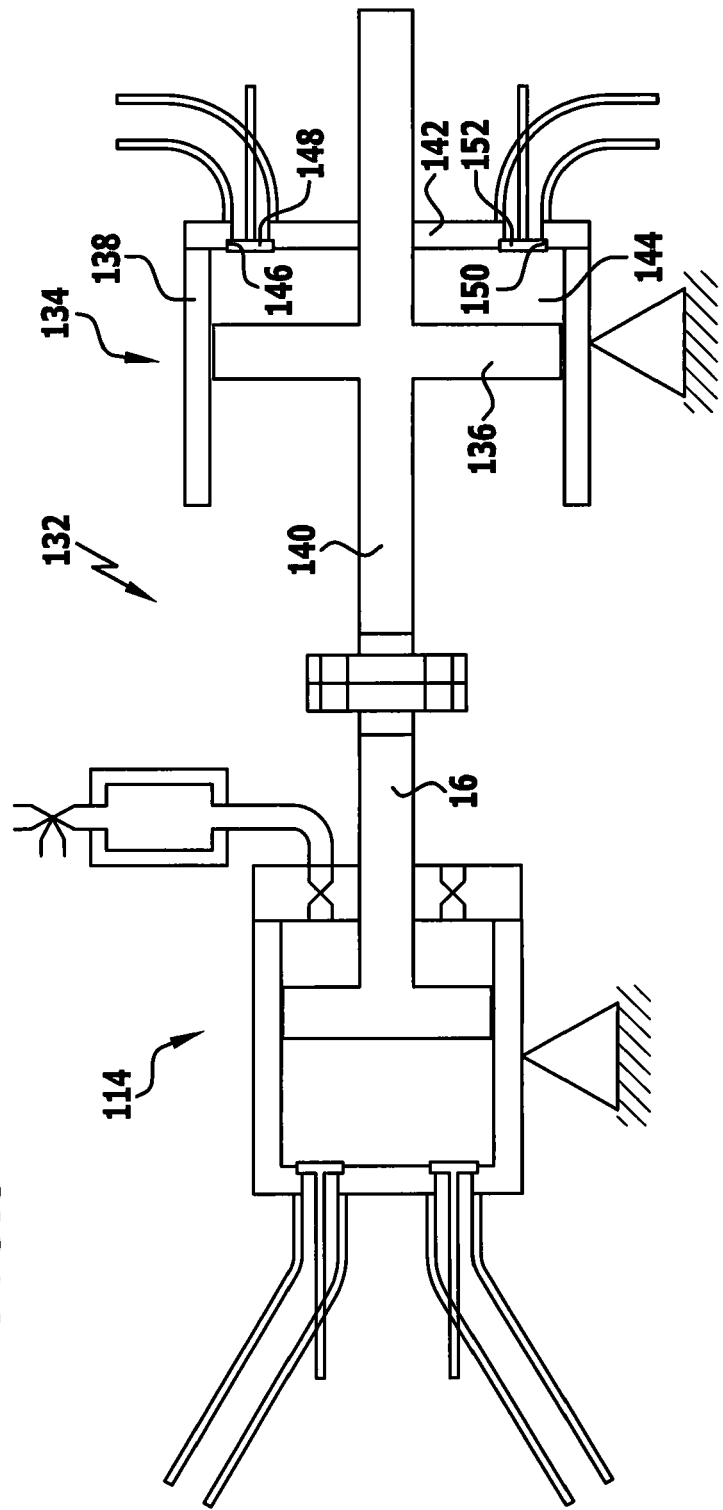
FIG. 5 a schematic illustration of a fifth exemplary embodiment of a free piston assembly in accordance with the invention.

In a fifth exemplary embodiment which is shown in FIG. 5 and referenced by 132 therein, a drive part 114 is again provided. To its active element 16 there is coupled a compressor 134. The compressor may serve for compressing a gas or a liquid. It may, for example, be a compressor for refrigerants, a hydraulic compressor or a water compressor (in the form of a pump for example).

The active element 16 is coupled to a piston 136 of the compressor which is guided in a corresponding cylinder 138. The active element 16 is connected directly to the piston 136 or to a piston rod 140 which is seated on the piston 136. A compression chamber 144 is formed between an end wall 142 and the piston 140. One or more inlet ports 146 each having a control valve 148 seated therein open into this compression chamber 144. A medium that is to be compressed is arranged to be coupled in through the inlet port 146.

Furthermore, one or more outlet ports 150 each having a control valve 152 seated therein are seated in the end wall 142. The compressed medium is removable through an outlet port.

The compressor shown in FIG. 5 is a single-stage one in the sense that it comprises only one compression chamber 144.

Figure 6:
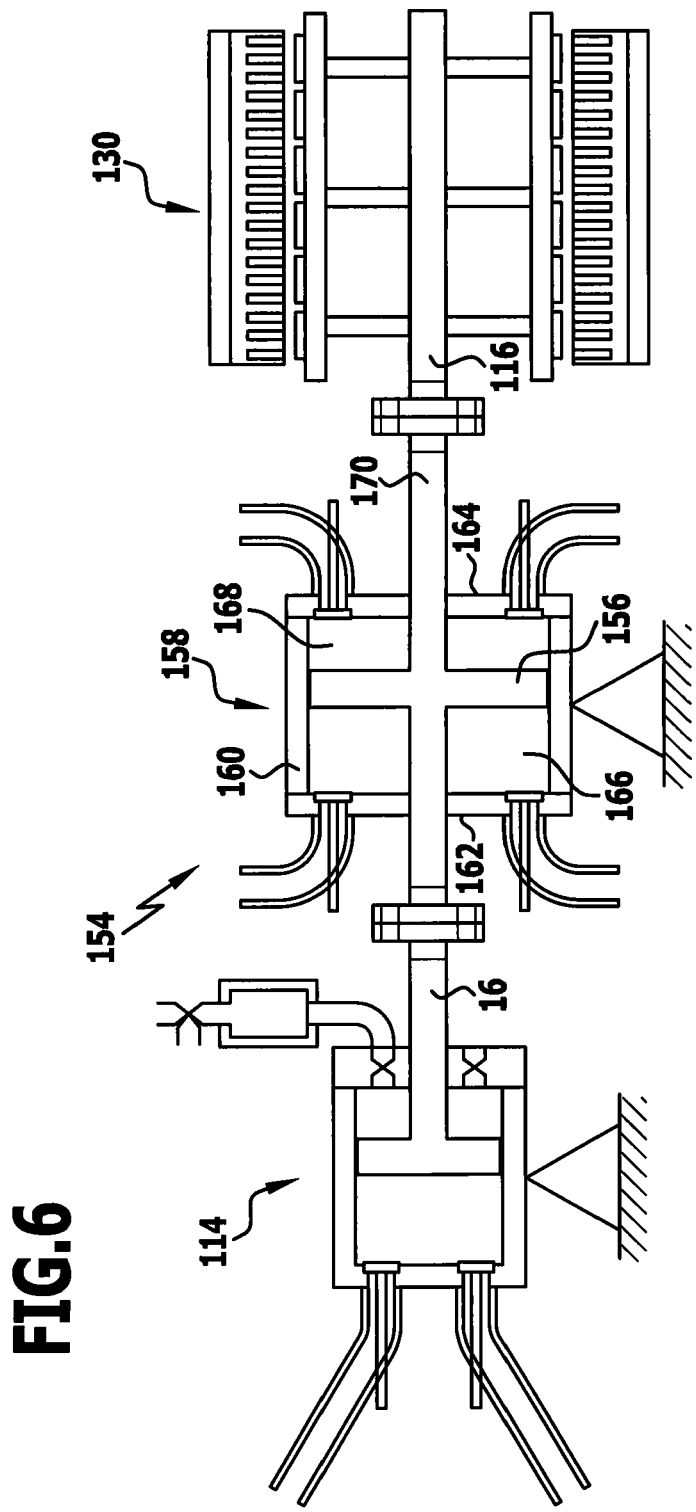
FIG. 6 a schematic illustration of a sixth exemplary embodiment of a free piston assembly in accordance with the invention.

In a sixth exemplary embodiment, which is shown in FIG. 6 and referenced by 154 therein, there is again provided a drive part 114 the active element 16 of which is coupled to a piston 156 of a compressor 158. The piston 156 is arranged in a cylinder 160 which is closed at a first end wall 162 and also at a second end wall 164 (apart from the inlet ports and outlet ports). A first compression chamber 166 and a second compression chamber 168 are formed in the cylinder 160. In this sense, the compressor 158 is a single-stage one. A medium can be compressed in both the first compression chamber 166 and the second compression chamber 168. A double effect is thereby obtained since it is possible to produce a corresponding compression process during both the forward movement and the backward movement of the piston 156. Pulsations can be reduced. Different compressive media can be used in order to optimise the overall process. The space occupied by the structure can also be minimized.

One or more inlet ports and one or more outlet ports are provided in the first compression chamber 166 and the second compression chamber 168 in order to enable the medium that is to be compressed to be admitted and the medium that has been compressed to be expelled.

The compressor 158 is connected in series (serially) with the drive part 114. In addition, a linear drive, which is constructed in a similar manner to the linear drive 130 for example, can be connected in series. For this purpose, the corresponding actuator 116 of this linear drive is coupled to a piston rod 170 on which the piston 156 is seated. The piston rod 170 is in turn coupled to the active element 16.

It is also possible to operate several application units in parallel. In an equivalent circuit diagram, the application units operating in parallel form a combination which is connected in series with the drive part 12.

The active element 16 is set into a linear back and forth movement, by the drive part 114 of the free piston assembly 154. This movement is transmitted via the coupling to the piston rod 170 and then transmitted to the actuator 116. The compressor 158 is operated by the piston rod 170. A current is produced in the linear drive 130 by the actuator 116.

Figure 7:
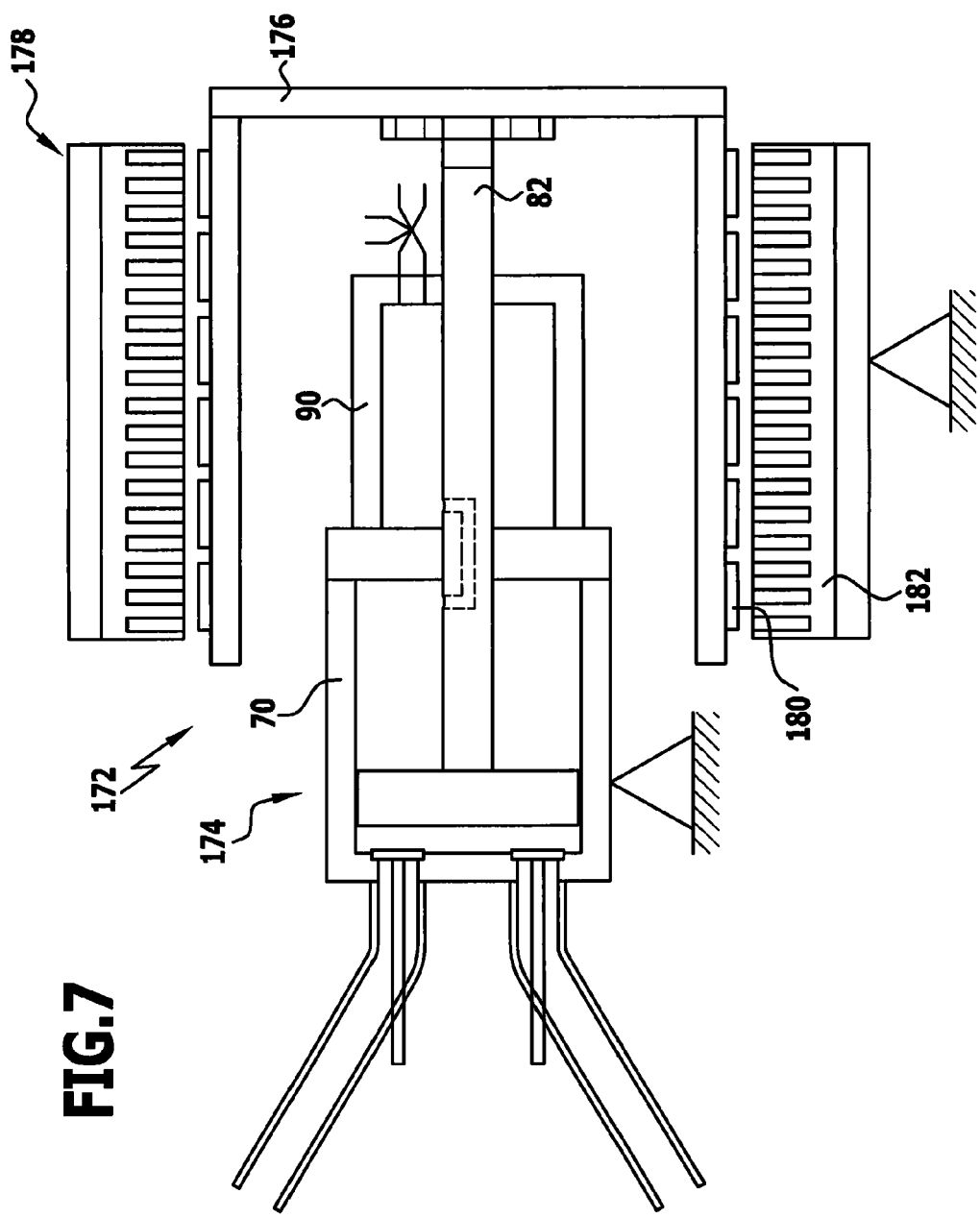
FIG. 7 a schematic illustration of a seventh exemplary embodiment of a free piston assembly in accordance with the invention.

In a seventh exemplary embodiment of a free piston assembly, which is shown in FIG. 7 and referenced by 172 therein, there is provided a drive part 174 which corresponds to the drive part in accordance with FIG. 3. The corresponding active element 82 is coupled to an actuator 176 of a linear drive 178. This actuator 176 is cup-shaped for example. It surrounds the pre-compression chamber 90 and also partly surrounds the piston accommodating device 70. In consequence, the longitudinal dimensions of the free piston assembly 172 including the linear drive 178 can be kept small. (The transverse dimensions in the longitudinal direction are thereby increased in certain circumstances.)

The actuator 176 carries a magnet device 180 for example. This is moved relative to a stationary stator 182 by the active element 82. A current can thus be produced.

In accordance with the invention, there is provided a free piston assembly wherein mechanical energy can be tapped off from a drive part. This thus results in a modular structure. Applications such as one or more compressors and one or more linear drives for example can be coupled thereto.

Furthermore, provision is made for an expansion space and a resilience space which neighbour directly on one another. They are delimited by the same piston by device of the opposite surfaces of this piston. This thus results in a compact structure insofar as the length is concerned.

Figure 8:
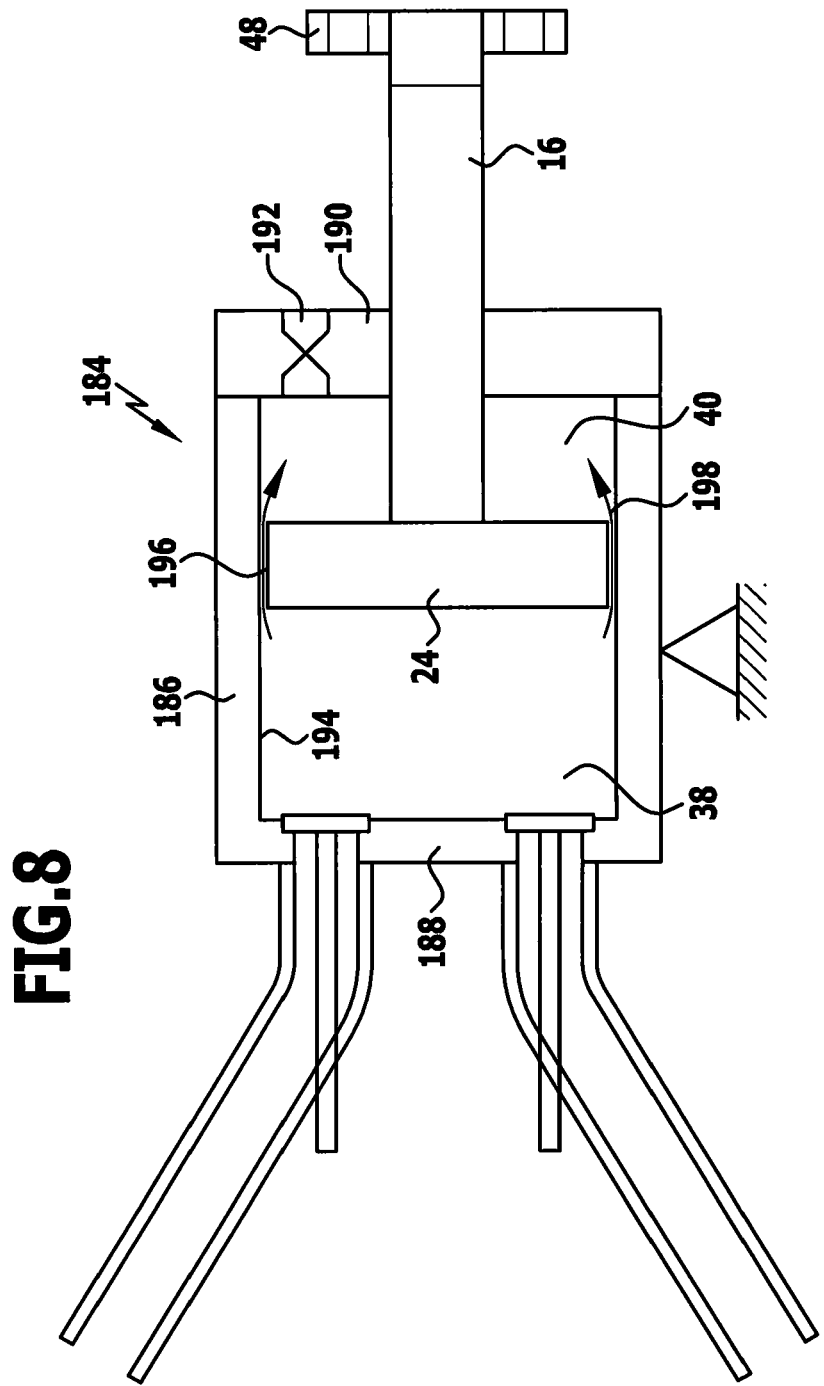
FIG. 8 a schematic illustration of an eighth exemplary embodiment.

In an eighth exemplary embodiment of a free piston assembly in accordance with the invention which is shown schematically in FIG. 8 and referenced by 184 therein, the structure is basically the same as that of the free piston assembly 10. The same reference symbols as those for the free piston assembly 10 are used for equivalent elements. The piston 24 is guided in a piston accommodating device 186 which comprises a first end wall 188 and a opposed second end wall 190. An (at least one) control valve 192 is arranged on the second end wall 190 which delimits the resilience space 40. In the case of the free piston assembly 184, the resilience space 40 is a gas spring chamber. Surplus gas can be discharged from the resilience space 40 by the control valve 192.

The piston 24 is guided along an inner surface 194 of the piston accommodating device 186. A guide surface 196 for the piston 24 is provided by the peripheral surface of the piston which faces the piston accommodating device 186. Basically, there are leaks between the guide surface 196 and the inner surface 194 so that the fluid, and in particular a gas, can enter the resilience space 40 from the expansion space 38. This is indicated in FIG. 8 by the arrows 198.

If the pressure in the expansion space 38 is higher than it is in the resilience space 40, then gas is forced out of the expansion space 38 into the resilience space 40 through such leaks. This is called blowby. This blowby can be used to maintain the pressure in the resilience space 40 which is in the form of a gas spring chamber or to reduce the pressure losses therein. Surplus gas can be discharged from the resilience space 40 by the control valve 192.

Otherwise, the free piston assembly 186 functions in the same manner as the free piston assembly 10.

Figure 9:
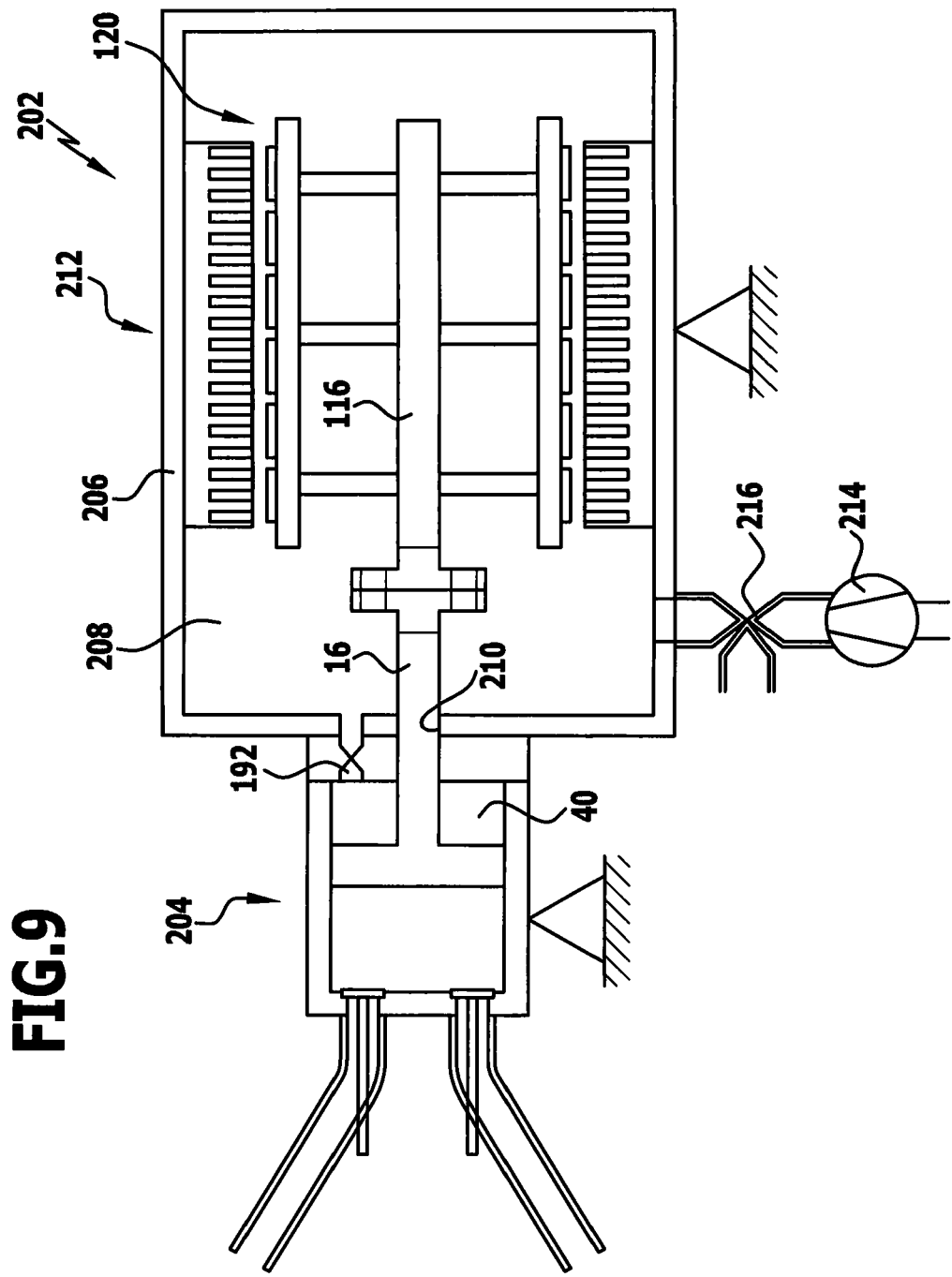
FIG. 9 a schematic illustration of a ninth exemplary embodiment.

In a ninth exemplary embodiment of a free piston assembly in accordance with the invention which is shown schematically in FIG. 9 and referenced by 202 therein, a drive part 204 which corresponds to the drive part of the free piston assembly 184 is connected to a pre-compression chamber 206. The at least one control valve 192 is connected to a pre-compression space 208 of the pre-compression chamber 206 in fluidic manner. Hereby, the at least one control valve 192 is bi-directional or else different unidirectional control valves are provided in order to allow a bi-directional exchange of pressure between the resilience chamber 40 of the drive part 204 and the pre-compression space 208.

The pre-compression chamber 206 comprises an opening 210 through which the active element 16 of the drive part 204 projects. The active part 16 is supported in the opening 210 and in particular, it is supported such as to be displaceable therein in sliding manner. This opening is sealed. A magnet device which corresponds to the magnet device 120 is arranged within the pre-compression space 208. The same reference symbols are therefore used. The active element 16 is then attached to an actuator 116. The actuator 116 is likewise located in the pre-compression space 208.

The pre-compression chamber 206 accommodates the magnet device. It is static. In toto, it forms an application part 212 to which the drive part 204 is attached.

A pump 214 by device of which a defined pressure can be set in the pre-compression space 208 is attached to the pre-compression space 208. The pump 214 is connected via a three-way valve 216 for example.

The pressure in the pre-compression space 208 is set by device of the pump 214. The pressure in the resilience chamber 40 can be set by the pressure in the pre-compression space 208 by device of the control valve 192.

An electric current can be produced from the movement of the active part 16 by device of the magnet device 120.

Otherwise, the free piston assembly 202 functions as described above in connection with the other exemplary embodiments.

Figure 10:
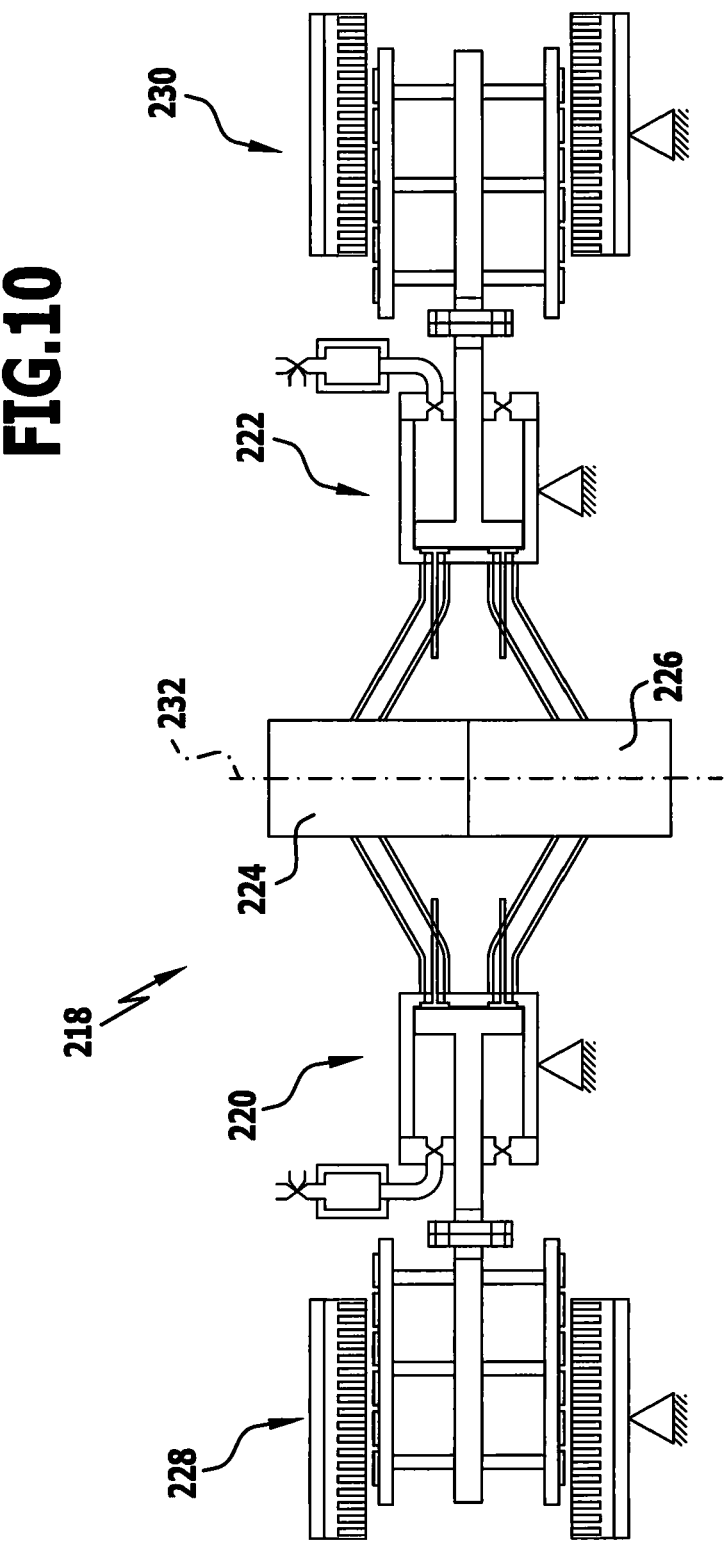
FIG. 10 a schematic illustration of a tenth exemplary embodiment.

A tenth exemplary embodiment, which is shown schematically in FIG. 10 and referenced by 218 therein, comprises a first drive part 220 and a second drive part 222. These drive parts 220, 222 are constructed in the same manner as the drive part 114 described above for example.

The first drive part 220 and the second drive part 222 are arranged such as to be mutually mirror-symmetrical for example. A common supply device 224 for a fuel-oxidizer mixture and a common removal device 226 for exhaust gas is associated therewith. A double system is thus formed.

A first application part 228 is attached to the first drive part 220 and a second application part 230 is attached to the second drive part 222. For example, the application parts 228 and 230 correspond to the linear drive 130 described above.

The arrangement is preferably symmetrical relative to a centre plane 232. Duplication of the drive parts and the application parts 220-228 and 222-230 can thereby be obtained in the double system.

The drive parts 220, 222 and the application parts of 228, 230 function as described above.

LIST OF REFERENCE SYMBOLS 10 free piston assembly
12 drive part
14 application part
16 active element
18 piston accommodating device
20 piston device
22 piston chamber
24 piston
26 direction
28 longitudinal axis
30 first piston surface
32 second piston surface
34 first end wall
36 second end wall
38 expansion space
40 resilience space
41 spring element
42 piston rod
44 opening
46 bearing device
48 coupling
50 inlet port
51 inlet valve
52 valve
53 pressure sensor
54 outlet port
55 pressure sensor
56 valve
57 ignition device
58 second embodiment
60 pre-compression chamber
62 pre-compression space
64 second end face
66 valve
67 pump
68 third embodiment
70 piston accommodating device
72 first end face
74 second end face
76 piston device
78 piston device
80 piston rod
82 valve element
84 coupling
86 expansion space
88 resilience space
90 pre-compression chamber
92 pre-compression space
94 first end face
96 second end face
98 opening
100 end wall
102 opening
104 opening
106 channel
108 first opening
110 second opening
112 fourth embodiment 114 drive part
116 actuator
118 longitudinal axis
120 magnet device
122 magnets
124 base
126 stator
128 coil
130 linear drive
132 fifth embodiment
134 compressor
136 piston
138 cylinder
140 piston
142 end wall
144 compression chamber
146 inlet port
148 control valve
150 outlet port
152 control valve
154 sixth embodiment
156 piston
158 compressor
160 cylinder
162 first end wall
164 second end wall
166 first compression chamber
168 second compression chamber
170 piston rod
172 seventh embodiment
174 drive part
176 actuator
178 linear drive
180 magnet device
182 stator
184 eighth embodiment
186 piston accommodating device
188 first end wall
190 second end wall
192 control valve
194 inner surface
196 guide surface
198 arrows
202 ninth embodiment
204 drive part
206 pre-compression chamber
208 pre-compression space
210 opening
212 application part
214 pump
216 three-way valve
218 tenth embodiment
220 first drive part
222 second drive part
224 supply device
226 removal device
228 first application part
230 second application part
232 centre plane

The invention claimed is:

1. A free piston assembly comprising:
at least one piston accommodating device;
at least one piston device having a first piston surface and a second piston surface facing away from said first piston surface which is moveable in a linear manner in the corresponding piston accommodating device;
an expansion space which is arranged in the piston accommodating device and delimited by the first piston surface;
wherein the piston device is arranged to be driven by the action of a medium which expands in the expansion space;
a resilience space arranged in the at least one piston accommodating device, said resilience space being delimited by the second piston surface;
wherein the resilience space is connected to at least one pre-compression chamber in fluidic manners; and
at least one linearly moveable active element that is connected to the piston device;
wherein the at least one piston accommodating device comprises a side from which there is guided out the at least one linearly moveable active element;
wherein the at least one active element is guided through the at least one pre-compression chamber;
wherein at least one channel, which has a first opening and a second opening, is arranged on the at least one active element;
wherein the position of the first opening and the second opening in relation to the resilience space and a pre-compression space of the pre-compression chamber is dependent on the position of the at least one active element; and
wherein the pre-compression space and the resilience space are connected together in fluidic manner via the channel in one or more positions of the piston device.

2. A free piston assembly in accordance with claim 1, wherein the expansion space and the resilience space are arranged linearly one behind the other.

3. A free piston assembly in accordance with claim 1, wherein the expansion space and the resilience space are separated by a piston of the piston device which comprises the first piston surface and the second piston surface.

4. A free piston assembly in accordance with claim 1, wherein the internal length of the piston accommodating device is composed of the length of the expansion space, the spacing between the first piston surface and the second piston surface and the length of the resilience space.

5. A free piston assembly in accordance with claim 4, wherein the spacing between the first piston surface and the second piston surface amounts to at most 30% of the entire internal length of the piston accommodating device.

6. A free piston assembly in accordance with claim 1, wherein the at least one active element is a piston rod.

7. A free piston assembly in accordance with claim 1, wherein the side is an end face which is oriented transversely relative to the direction of motion of the piston device.

8. A free piston assembly in accordance with claim 1, wherein a wall, which faces the second piston surface, is arranged at said side.

9. A free piston assembly in accordance with claim 8, wherein the wall delimits the resilience space.

10. A free piston assembly in accordance with claim 9, wherein a bearing for the at least one active element is arranged in the wall.

11. A free piston assembly in accordance with claim 8, wherein the wall has an opening through which the at least one active element is passed.

12. A free piston assembly in accordance with claim 1, wherein the at least one active element is guided partially through the resilience space.

13. A free piston assembly in accordance with claim 1, wherein the at least one active element comprises a coupling for coupling-on an application.

14. A free piston assembly in accordance with claim 1, wherein the expansion space has at least one inlet port associated therewith.

15. A free piston assembly in accordance with claim 14, wherein a valve is arranged at the at least one inlet port.

16. A free piston assembly in accordance with claim 1, wherein the expansion space has at least one outlet port associated therewith.

17. A free piston assembly in accordance with claim 16, wherein a valve is arranged at the outlet port.

18. A free piston assembly in accordance with claim 1, wherein the resilience space is a gas spring space in which a compressible medium is accommodated.

19. A free piston assembly in accordance with claim 1, wherein a control unit is provided for controlling the connection.

20. A free piston assembly in accordance with claim 1, wherein the at least one pre-compression chamber is connected to the resilience space by means of an end face of the piston accommodating device.

21. A free piston assembly in accordance with claim 1, wherein the position or the positions is or are a point of reversal or a point in the proximity of a point of reversal of the piston device.

22. A free piston assembly in accordance with claim 1, wherein at least one linear drive is connectable or is connected to the piston device.

23. A free piston assembly in accordance with claim 22, wherein the at least one linear drive comprises a stator and an actuator which are connected to at least one active element of the piston device.

24. A free piston assembly in accordance with claim 22, wherein the at least one linear drive follows on to the piston accommodating device in a direction parallel to the direction of motion of the piston device.

25. A free piston assembly in accordance with claim 1 wherein the at least one channel has an extension in a direction of linear movement of the at least one active element.

* * * * *